United States Patent [19]

Homma et al.

[11] Patent Number: 4,878,754

[45] Date of Patent: Nov. 7, 1989

[54] METHOD OF AND APPARATUS FOR MEASURING IRREGULARITIES OF ROAD SURFACE

[75] Inventors: Kazuya Homma; Hiroshi Nogi; Koichi Yamada; Masahiro Kitazume; Masamitsu Uzawa; Makoto Aoki, all of Tokyo, Japan

[73] Assignee: Tokyo Keiki Co. Ltd., Tokyo, Japan

[21] Appl. No.: 107,992

[22] Filed: Oct. 14, 1987

[30] Foreign Application Priority Data

Oct. 16, 1986 [JP] Japan ................................ 61-246039
Oct. 16, 1986 [JP] Japan ................................ 61-246040
Dec. 19, 1986 [JP] Japan ................................ 61-303247
Dec. 19, 1986 [JP] Japan ................................ 61-303248

[51] Int. Cl.$^4$ ............................................. G01B 11/30
[52] U.S. Cl. ........................................ 356/376; 356/1; 356/371
[58] Field of Search ........................... 356/1, 376, 371; 73/146

[56] References Cited

U.S. PATENT DOCUMENTS

| | | | |
|---|---|---|---|
| 4,343,553 | 8/1982 | Nakagawa et al. | 250/560 |
| 4,647,209 | 3/1987 | Neukomm et al. | 356/376 |
| 4,700,223 | 10/1987 | Shoutaro et al. | 356/376 |
| 4,730,116 | 3/1988 | Ida et al. | 356/376 |

FOREIGN PATENT DOCUMENTS

132200  1/1985  European Pat. Off. ................ 356/1

Primary Examiner—Richard A. Rosenberger
Attorney, Agent, or Firm—Sandler & Greenblum

[57] ABSTRACT

A method of and apparatus for measuring any irregularity on a road surface by applying a beam onto a measuring point on the road surface and detecting any change in the vertical position of the center of the beam spot formed on the road surface thereby obtaining data concerning the irregularity on the road surface. The beam spot on the road surface is detected by a unidimensional CCD sensor and the position of the center of the beam spot is determined from the output of the unidimensional CCD sensor. The thus obtained data concerning the position of the center of the spot is suitably processed so that data concerning the irregularity on the road surface is obtained.

11 Claims, 13 Drawing Sheets

(SPOT POSITION DATA) → HEIGHT CONVERSION TABLE → (HEIGHT DATA)

FIG. 13

(BIT ADDRESS) (HEIGHT DATA)

(WHEN REFLECTION LIGHT QUANTITY IS LARGE)

SATURATION (CENTER POSITION IS NOT DETECTED ACCURATELY)

(SPOT IS NOT FOUND)

METHOD OF AND APPARATUS FOR MEASURING IRREGULARITIES OF ROAD SURFACE

BACKGROUND OF THE INVENTION

1. Field of the Invention

The present invention relates to a method of and an apparatus for measuring irregularities of road surface and, more particularly, to a method of and an apparatus for measuring irregularities of road surface by a cooperation between a beam signal transmitting portion for applying a spot of a laser beam onto the road surface and a beam signal receiving portion for receiving the laser beam reflected by the road surface.

2. Description of the Prior Art

A method for measuring irregularities of a road surface has been known in which a spot of a laser beam is applied to the road surface and the reflected laser beam is received by a photo-sensor which produces a signal indicating the height of irregularity, e.g., a convexity or concavity, whereby information concerning the irregularity is obtained.

This known method, however, suffers from a problem in that the center of the laser beam spot is not always located correctly, due to variation in the state of the road surface such as color, gradient and degree of wetness of the road surface, with the result that the quality of the information concerning the irregularity is impaired to cause an error in the measurement.

The known measuring method making use of a laser beam usually employs an image processing system which processes the detection signal into image signals so as to visualize the road irregularity information thereby facilitating the examination of the state of the road surface. In consequence, the scale of the measuring apparatus becomes so large that the apparatus cannot have a wide adaptability.

Figure 1:
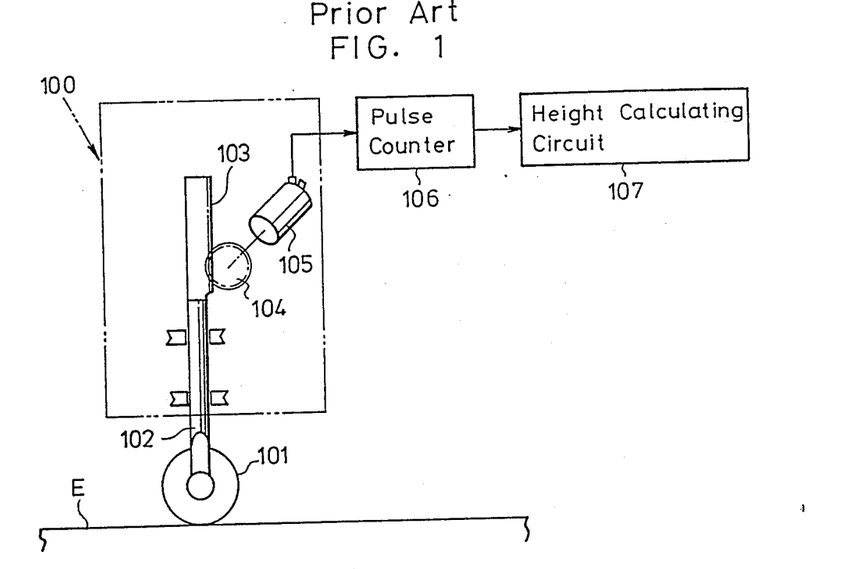
FIGS. 1 and 2 are schematic illustrations of a known road surface irregularity measuring apparatus.

Also known is a mechanical-type apparatus for measuring irregularity of the road surface. This apparatus has a sensor portion 100 which includes a shaft 102 adapted to be moved up and down in accordance with vertical displacement of a roller 101 which follows any irregularity of a road surface A, a rack 103 fixed to the shaft 102, a pinion 104 meshing with the rack 103 and an encoder 105 adapted to be rotated by the pinion 104. Thus, the irregularity of the road surface is converted into a vertical movement of the shaft 102 and the rack 103 and is further converted into rotational displacement in the encoder 105 through the engagement between the rack 103 and the pinion 104. The encoder 105 produces pulses of a number corresponding to the rotational displacement, and the number of the pulses is counted by a pulse counter the output of which is delivered to a height calculating circuit 107 which calculates the height of the irregularity thereby producing irregularity information.

Figure 2:
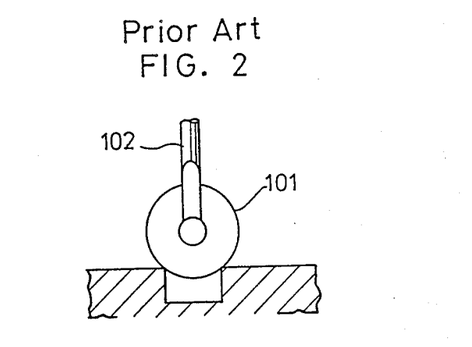

This mechanical-type measuring apparatus, however, is disadvantageous in that the reliability is impractically low due to the fact that the path of transmission of measured value involves may movable mechanical parts. In addition, the measuring accuracy is largely affected by the diameter of the roller, particularly when the surface of a long road is measured continuously. For instance, a too small diameter of the roller will hamper the measurement because such a small roller cannot roll onto any step which may exist on the road surface. Conversely, a too large roller diameter will impair the accuracy of the measured data because such a large roller cannot well respond to small recess which may exist in the road surface, as shown in FIG. 2.

SUMMARY OF THE INVENTION

Accordingly, a first object of the present invention is to provide a method of measuring irregularities of a road surface in which the position of the center of a beam spot is exactly determined so as to ensure a high degree of precision in the measurement.

To this end, the present invention provides a measuring method in which any change in the vertical position of a beam spot emitted from a beam signal transmitting section is sensed by an optical sensor, and the center of the width of the beam spot is determined. The data concerning the position of the center of the beam spot is processed by a suitable processing means. The processed data is output as road surface irregularity information.

A second object of the present invention is to provide an apparatus which is capable of continuously measuring irregularity of road surface with a high degree of precision.

To this end, the present invention provides a measuring apparatus which has a beam signal transmitting portion adapted to apply a beam spot to the portion of the road surface to be measured, and a photo-sensor portion adapted to detect the light on the portion of the road surface to which the beam spot is applied. The photo-sensor portion includes a CCD (Charge Coupled Device) sensor and a condenser lens disposed on the incident side of the CCD photo-sensor. The apparatus further includes memory means for storing detection signal which is output from the photsensor portion, first processing means for determining the position of the center of the light in accordance with the output from the memory means, second processing means for determining the level or height of the road surface, and supporting means capable of moving the beam signal transmitting portion and the photo-sensor portion as a unit along the road surface.

A third object of the present invention is to provide a method and apparatus for measuring irregularities of road surface in which the influence of factors attributable to a change in the state of the road surface is minimized so as to make it possible to accurately determine the position of the center of the beam spot when the quantity of light received from the road surface is small.

To this end, according to the present invention, the output from the photo-sensor portion is processed by a processing means which has at least two amplifiers having different values of amplification factor, in combination with a data selection circuit which selects the output from desired one of the amplifiers, whereby the measurement is conducted accurately regardless of any change in the quantity of received light.

BRIEF DESCRIPTION OF THE DRAWINGS

FIG. 8(1) to 8(3) are waveform charts showing the relationship between the output from a line buffer incorporated in the signal processing system shown in FIG. 7 and a threshold value, as well as binarized signals;

FIGS. 15(1), 15(2), 16(1) and 16(2) are illustrations for explaining patterns of received light after amplification by amplifiers having different values of amplification;

DESCRIPTION OF THE PREFERRED EMBODIMENTS

Preferred embodiments of the present invention will be described hereinunder with reference to the accompanying drawings. Throughout the drawings, the same reference numerals are used to denote the same or equivalent portions, and duplication of explanation of such portions is omitted or simplified.

Figure 3:
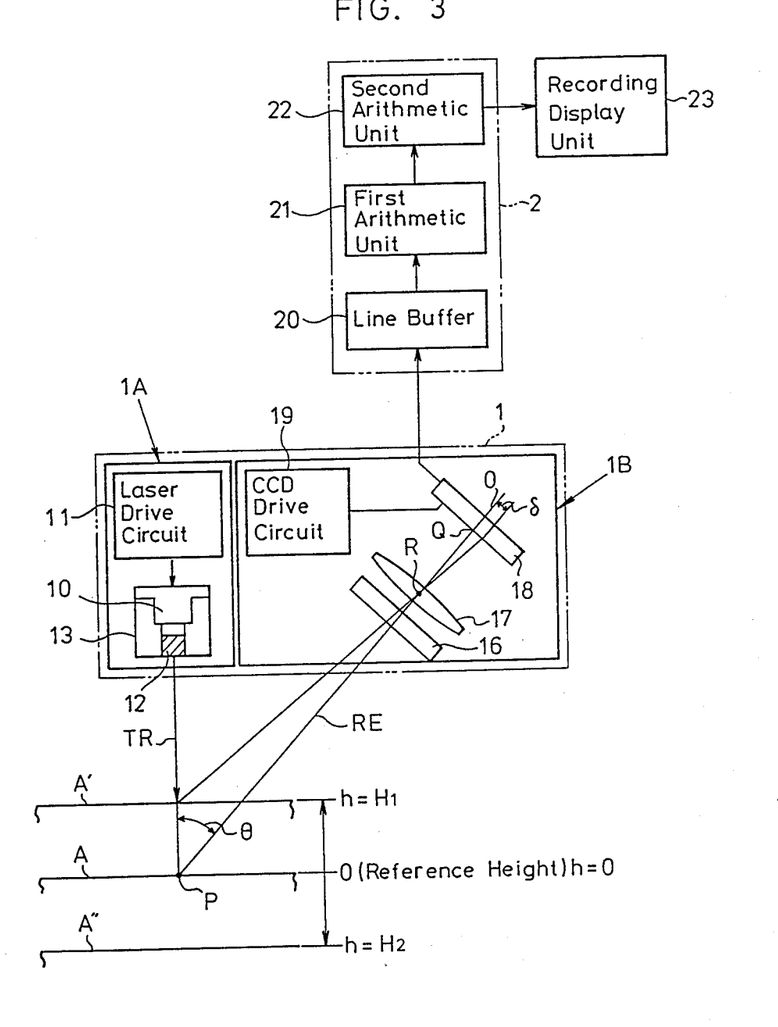
FIG. 3 is an illustration of a signal processing system employed in a first embodiment of the road surface irregularity measuring apparatus of the present invention.

Referring first to FIG. 3 showing an embodiment of the measuring apparatus of the present invention, a laser beam transmitting/receiving unit 1 is composed of a beam signal transmitting portion 1A and a photo-sensor portion 1B. The beam signal transmitting portion 1A includes a semiconductor laser element 10, a laser drive circuit 11 for driving the semiconductor laser element 10, a lens portion 12 for converging a laser beam emitted from the semiconductor laser element 10, and a supporting member which integrally supports the lens portion 12 and the semiconductor laser element 10. In operation, the laser drive circuit 11 drives the semiconductor laser element 10 so that the latter emits a laser beam which is converged by the lens portion 12 into a parallel beam having an optical axis TR which is substantially perpendicular to the plane A of the road surface so that the parallel laser beam impinges upon a point to be measured on the road surface.

On the other hand, the photo-sensor portion 1B of the laser beam signal transmitting/receiving unit 1 has, as mentioned from the side closer to the road surface, an interference filter 16, a condenser lens 17 and a unidimensional CCD sensor 18. The CCD sensor 18 is adapted to be driven by a CCD drive circuit 19. A signal processing portion 2 is connected to the output side of the unidimensional CCD sensor 18. The photo-sensor portion 1B is so arranged that it has a received light optical axis RE which intersects, at a reference level or height of the road surface A, the optical axis TR of the transmitted beam at an angle $\theta$. In this state, the laser spot on the road surface A is detected by the unidimensional CCD sensor 18 with a detecting level distribution along the length of the sensor as exemplarily shown in FIG. 4. Namely, a multiplicity of bits of storing the unidimensional CCD sensor produce output levels corresponding to the quantity of light received by these bits. In the example shown in FIG. 4, the (n+5)th bit exhibits the maximum quantity of received light. Thus, the position of this bit corresponds to the position of the center of the beam spot, and a signal representing the position of this bit is output as a signal indicative of the position of the beam spot center.

The signal processing portion 2 includes a line buffer 20 which constitutes a memory capable of data collected during each scanning cycle of the unidimensional CCD sensor 18, a first arithmetic unit 21 constituting a first processing means which computes the position of the center of the output from the line buffer 20, and a second arithmetic unit 22 constituting a second processing means for computing the level or height of the measured point on the basis of the output from the first arithmetic unit 21. The road surface irregularity information as computed by the second arithmetic unit 22 is recorded and displayed on a recording/display unit 23.

Figure 5:
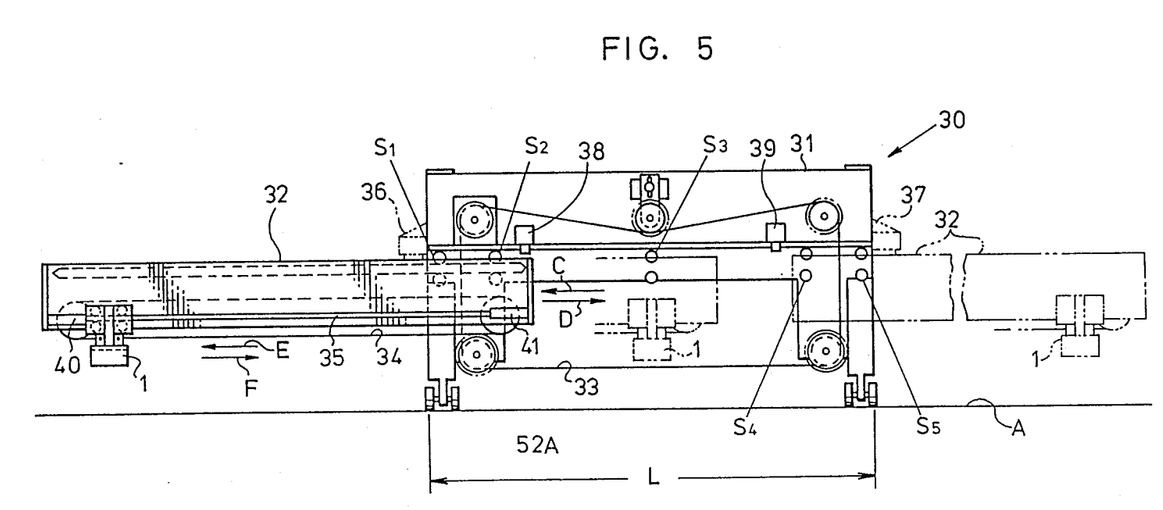
FIG. 5 is an illustration of supporting means which supports beam signal transmitting and receiving portions incorporated in the measuring apparatus of the present invention.

The laser beam transmitting/receiving unit 1 is actually carried by a supporting mechanism 30 shown in FIG. 5. The supporting mechanism 30 includes a frame 32 capable of reciprocatingly moving as indicated by arrows C,D along the road surface A which in this case includes the points A' and A" shown in FIG. 1. The laser beam transmitting/receiving unit 1 is mounted on the movable frame 32. In order to increase the coverage, the laser beam transmitting/receiving unit 1 itself is movable reciprocatingly on the movable frame 32. The movable frame 32 is movable, while being guided by guide rollers $S_1$, $S_2$, $S_3$, ..., $S_5$ from the left position shown by solid lines to a right position shown by two-dot-and-dash line as viewed in FIG. 5. Therefore, the laser beam transmitting/receiving unit 1 has an effective coverage which is two or more times as large as the length L of a main frame 31.

A driving chain 33 on the main frame 31 is drivingly connected to a driven chain 34 which is suitably extended on the movable frame 32. The laser beam transmitting/receiving unit 1 is adapted to be moved reciprocatingly as indicated by arrows E, F along guide rails 35 laid on the movable frame 32. A pair of braking means 36, 37 provided on both sides of the main frame 31 is adapted to prevent any unintentional or unexpected movement of the movable frame 32. Thus, a predetermined positional relationship is always maintained between the movable frame 32 and the main frame 31, regardless of any gradient of the road surface A on which the supporting mechanism is situated. Sensors 38, 39 provided on the main frame 31 is adapted to detect arrival of the movable frame 32 at the respective allowable stroke ends, thereby preventing the movable frame from moving beyond the stroke ends. Stopper 40 and 41 are provided on both sides of the movable frame 32 so as to limit the movement of the laser beam transmitting/receiving unit 1.

Figure 6:
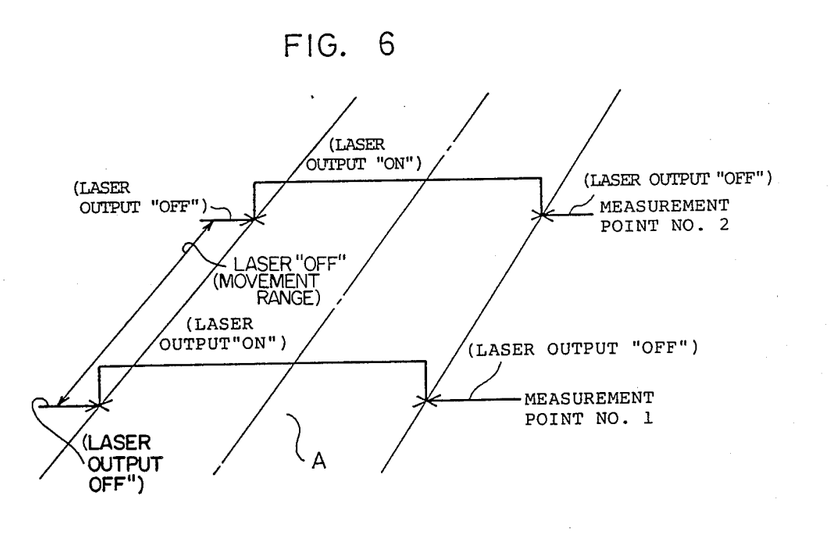
FIG. 6 is an illustration of the state of a laser beam output in relation to the locus of the supporting means.

The whole supporting mechanism 30 is capable of traveling along the road surface A, as shown in FIG. 6. Namely, the supporting mechanism 30 is first placed on a first measurement point No. 1 on the road surface and the measurement of irregularity of the road surface A is conducted by activating the laser beam transmitting-/receiving unit 1, and the supporting mechanism is then moved to a second measurement point No. 2 where the same measuring operation is conducted.

The operation of the signal processing system employed in this embodiment will be explained hereinunder.

The road surface A (see FIG. 3) irregularly reflects the laser beam so that the portion on the road surface A upon which the laser beam impinges is observed as if a spotlike laser source exists at this portion, from the position of the photo-sensor portion 1B. When the laser beam is applied to a point P on the road surface A(see FIG. 1), since the optical axis RE of the light received by the photo-sensor portion 1B passes this point P, the image of the central portion of the laser spot formed on the road surface is formed on the central point Q of the unidimensional CCD sensor 18. However, when the level or height of the road surface is elevated by an amount h from the level of the road surface A to a level indicated by A', the image of the laser spot formed at this elevated level is formed on the unidimensional CCD sensor 18 at a position which is offset by an amount $\delta$ from the center O of the sensor 18. Representing the center of the condenser lens 17 by R, the relationship between the height difference h and the offset $\delta$ of the signal position is given by the following formula (1).

$$h = \delta \cdot RP/(\delta \cdot \cos \theta + QR \sin \theta) \quad (1)$$

Arithmetic operation in accordance with this formula is executed by the second arithmetic unit 22 mentioned before.

The position of the center of the laser spot image, i.e., the position of the center of the image formed on the unidimensional CCD sensor 18, can simply be regarded as the center of the image-forming line, even when there is any deviation of the whole signal pattern. The computation for determining the position of the center of the beam spot is performed by the first arithmetic unit 21.

As stated before, the described embodiment incorporates an interference filter 16 disposed on the incident side of the condenser lens 17. The interference filter 16 is adapted pass only lights of wavelengths around the wavelength of the laser beam, so as to exclude any unfavorable effect of the solar light. The use of this filter enables the measurement to be conducted in day time.

A second embodiment of the invention will be described hereinunder with specific reference to FIGS. 7 to 10. This second embodiment is characterized in that the detection signal derived from the photo-sensor portion 1B is binarized by means of a suitable threshold value so that the irregularity of the road surface is conducted on the basis of the binarized signals.

Figure 7:
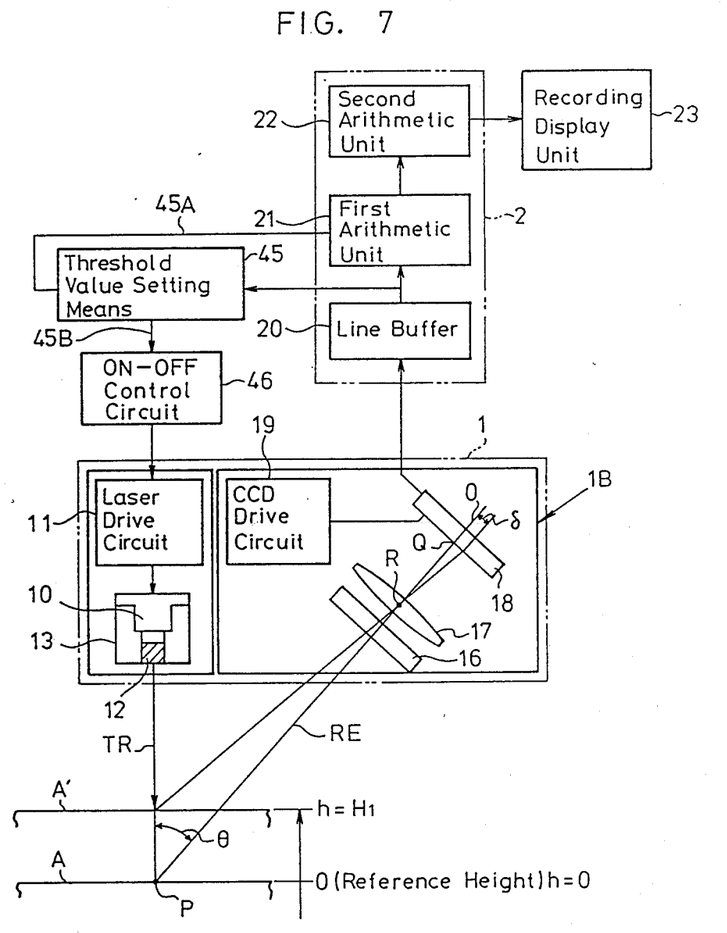
FIG. 7 is an illustration of a signal processing means in a second embodiment.
Figure 8:
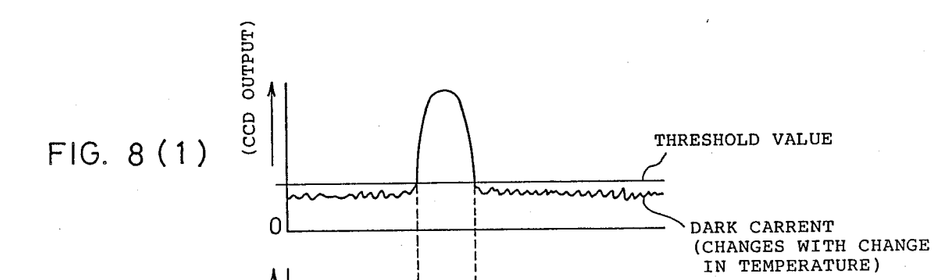

For the purpose of the binary signal processing, the signal processing section 2 of this embodiment has, as shown in FIG. 7, a threshold value setting means 45 controlled by a CPU 47 (see FIG. 9), and an on-off control circuit 46 adapted to deliver on-off control signals to the laser drive circuit 11 in accordance with the output from the threshold value setting means 45.

The threshold value setting means 45 is designed such that it can output one of a plurality of threshold levels in accordance with the condition. In this embodiment, the first arithmetic unit 21 binarizes the output from the line buffer 20 by means of the threshold value set by the threshold value setting means 45, and determines the position of the center of the beam spot on the basis of the binarized signal. More specifically, the threshold value is set at a level which is higher than the level of the dark current as shown in FIG. 8(1) and the output from the line buffer 20 is binarized by this threshold value so that a signal as shown in FIG. 8(2) is obtained. This binary signal is then suitably processed. FIG. 8(3) shows a case where the signal involves a large noise component as a result of an increase in the dark current. In such a case, the binary signal as shown in FIG. 8(2) is obtainable by employing another threshold level by the operation of the threshold value setting circuit.

The threshold value setting means 45 has a function for detecting the level of the dark current and for setting a suitable threshold level capable of cutting off the dark current so as to produce a threshold value signal 45A, and a function for outputting a starting signal 45B for starting the laser drive circuit 11. The threshold value signal is delivered to the first arithmetic unit 21, while the starting signal 45B is delivered to the on-off control circuit 46 of the laser drive circuit 11. Upon receipt of the starting signal 45B from the threshold value setting circuit 45, the on-off control circuit recognizes this signal as an operation signal and enables the laser drive circuit 11 to start to operate without delay.

Figure 9:
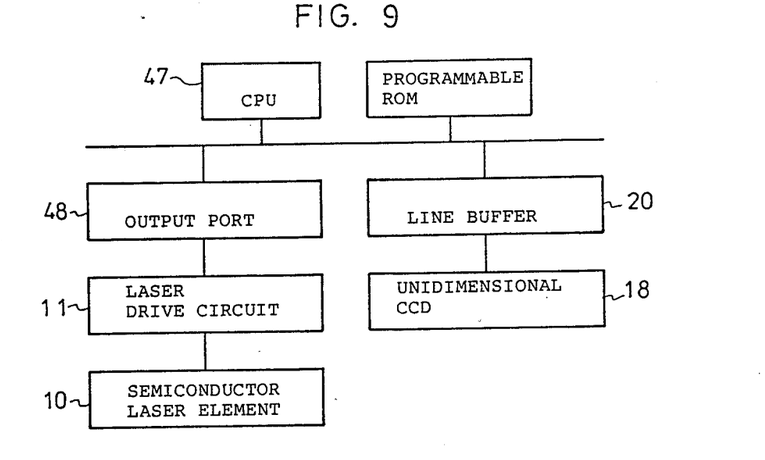
FIG. 9 is a block diagram of a driving system for driving the beam signal transmitting portion.
Figure 10:
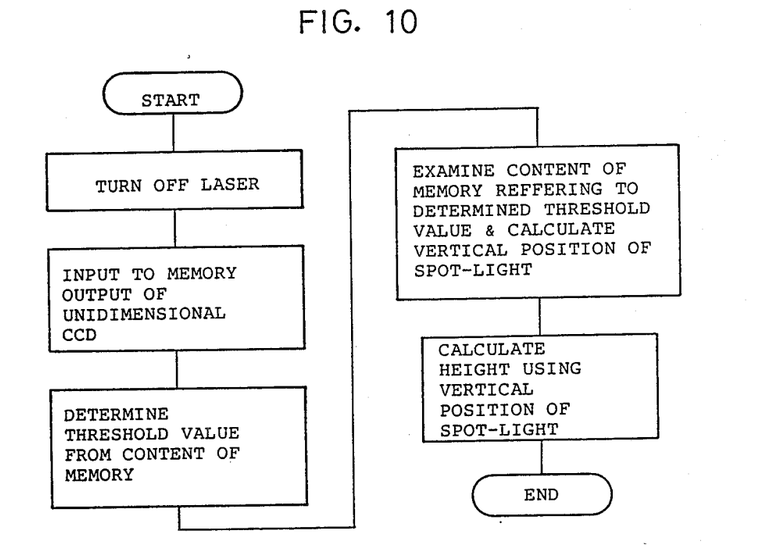
FIG. 10 is a flow chart illustrating the operation of the driving system shown in FIG. 9.

The signal processing system as shown in FIG. 7 has been programmed a shown in FIG. 9, and the program is executed in accordance with a flow as shown by the flow chart in FIG. 10.

More specifically, the CPU 47 controls the laser drive circuit 11 through an output port 48 in the on-off control circuit 46, thereby turning off the power of the semiconductor laser element 10. In this state, the threshold value setting means 45 receives the output from the unidimensional CCD sensor 18 through the line buffer 20 which serves as a memory device, and determines a suitable threshold value upon examining the content of the memory device. For instance, the threshold value is determined as "maximum value in memory plus $\alpha$" or as "mean value in memory plus $\alpha$". As this threshold value is determined, the laser drive circuit 11 is started without delay through the on-off control circuit 46, thereby to enable the laser element 10 to emit a laser beam. Then, the reflected light signals are received by the unidimensional CCD sensor 18 under the application of the laser beam on the road surface and the thus obtained signals are stored in the line buffer 20. The signals stored in the line buffer 20 are then binarized in accordance with the threshold value which has been determined by the threshold value setting means 45 as explained before. Thus thus obtained binarized signals are then processed substantially in the same manner as that explained in connection with the first embodiment.

In this embodiment, when the level of the noise is increased by a change in the ambient temperature or heating of the photo-sensor portion, such a change in the noise level does not adversely affect the quality of the measured data because the threshold level for excluding such noise is automatically changed in accordance with the change in the level of the noise. It is therefore possible to continue the measurement without being adversely affected by any change in the noise level.

A third embodiment of the present invention will be described hereinunder with specific reference to FIGS. 11 and 12.

This embodiment is characterized in that the data concerning the height or level of the measured point is beforehand stored as a map or table in relation to the change in the position of the beam spot, so that the level or height of the measured point is directly determined from the table or map in accordance with the value of the change in the vertical position of the beam spot. Thus, this embodiment does not necessitate any arithmetic operation for determining the level or height of the measured point which is necessary in the preceding embodiments.

In this embodiment, an amplifier 55 and an A/D converter 56 are disposed between the photo-sensor portion 1B and the line buffer 20 of the signal processing portion 2. The signal processing portion 2 further includes a spot position calculating unit 58 and a memory means 59 corresponding to the first and the second arithmetic units, respectively, in the preceding embodiments.

Figure 4:
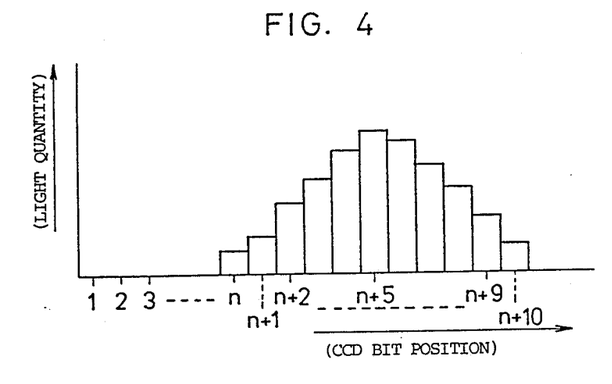
FIG. 4 is an illustration of the state of imaging on a unidimensional CCD sensor which constitutes a photosensor portion in the apparatus of the present invention.

The spot position calculating unit 58 has a function for locating the bit NO. of the element which is at the center of the spotted region on the unidimensional CCD sensor 18. In the case where the light on the unidimensional CCD sensor has a distribution as shown in FIG. 4, (n+5) is determined as the bit No. The memory means 59 stored data concerning the level or height of the measured point in relation to the spot position. Therefore, the level or height of the measured point can be directly located from the data stored in the memory means 59, on the basis of the output from the spot position calculating unit 58.

More specifically, the spot position calculating unit 58 produces an output $n_i$ which indicates that the center of the spot is located on the n-th bit as counted from the center of the sensor. Upon receipt of this signal $n_i$, the memory means 59 outputs height data $h_i$ which is stored in an address $n_i$ of a ROM which constitutes a position-height conversion table (see FIG. 12). Representing the bit address and the height data generally by $n_k$ and $h_k$, and representing the pitch of the element in the unidimensional CCD sensor 18 by p, the following relationship exists between the bit address and the height data.

$$h_k = n_k \cdot p \cdot RP/(n_k \cdot p \cdot \cos\theta + QR \cdot \sin\theta) \quad (2)$$

Figure 11:
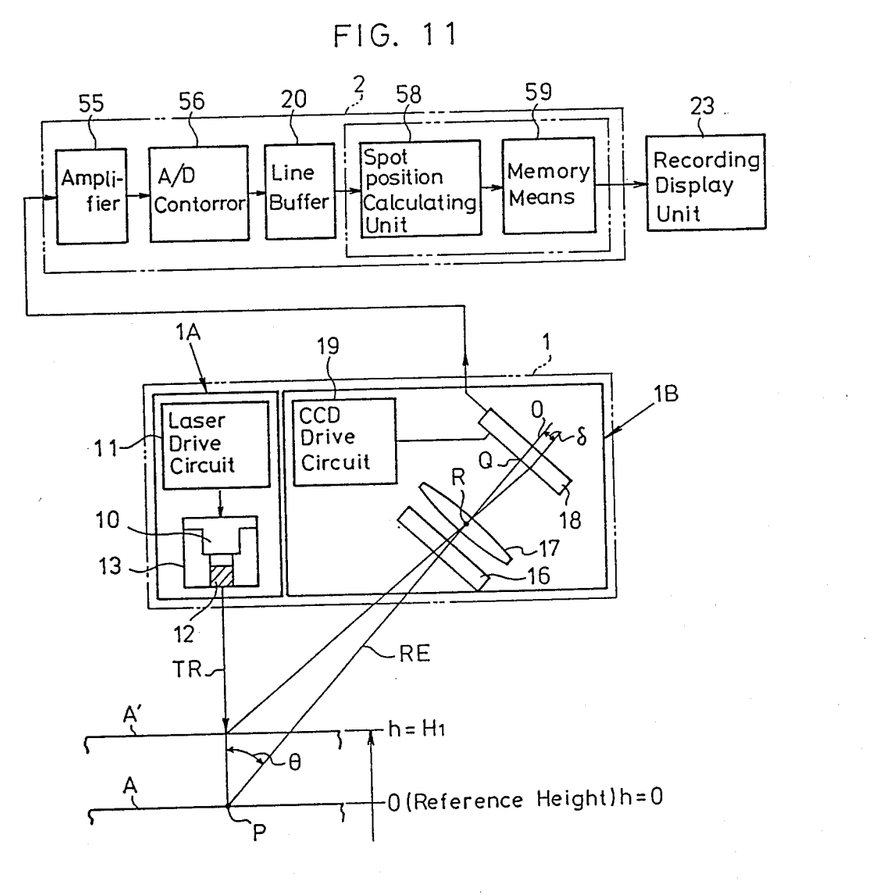
FIG. 11 is an illustration of a signal processing system in a third embodiment of the present invention.
Figure 12:
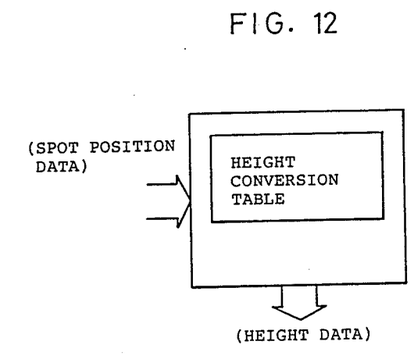
FIGS. 12 and 13 are illustrations of functions of memory means incorporated in the processing system shown in FIG. 11.
Figure 13:
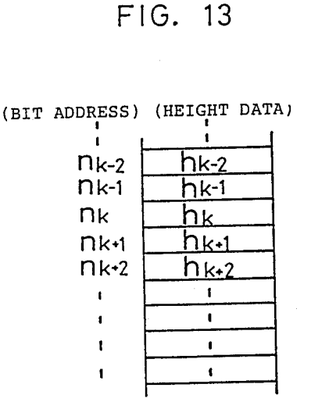

(k=1, 2, 3, ... - i ... ,)

where, RP and QR represent distances between the points R and P and between the points Q and R as shown in FIG. 11.

Height data $h_k$ is minutely computed for each value of the address $n_k$ in accordance with the formula (2), and the thus calculated data is beforehand stored in the memory means 59, so that height data corresponding to a given address data can be directly derived from the content of the memory means 59 without necessitating computation.

This embodiment, therefore, offers an advantage in addition to those offered by the preceding embodiment in that the speed of measurement is increased because of elimination of the arithmetic operation for determining the height of the measured point. In consequence, the measurement of a road of a given length can be completed in a shorter time.

FIGS. 14 to 19 in combination show a fourth embodiment of the present invention. This embodiment is improved in such a way as to ensure safe receipt of the beam spot despite any change in the condition of the road surface such as color, gradient, wetness, presence of sand particles, and so forth.

Figure 14:
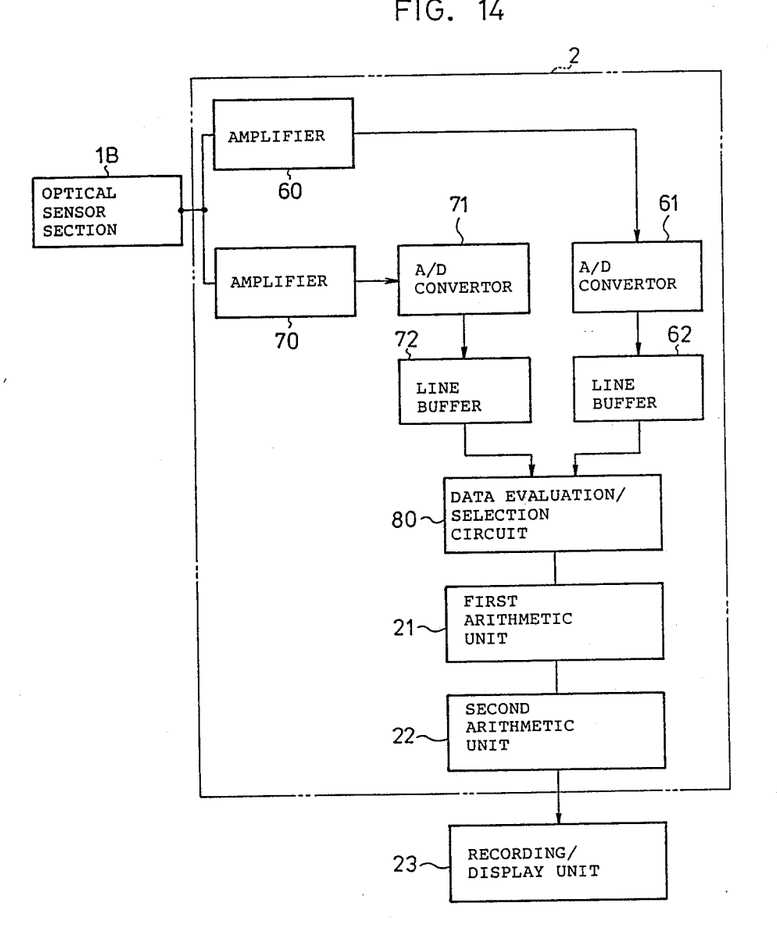
FIG. 14 is an illustration of a signal processing system used in a fourth embodiment of the present invention.
Figure 15:
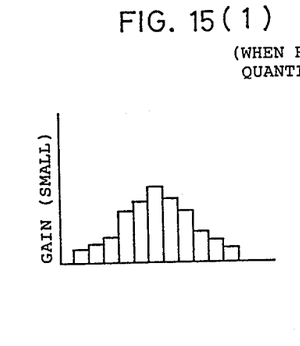
Figure 16:
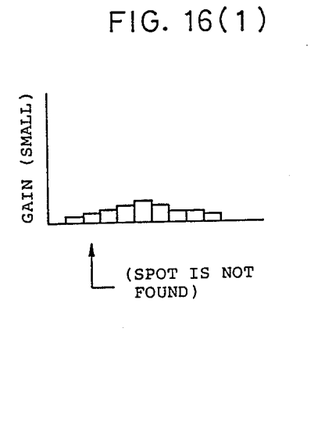

As shown in FIG. 14, the signal processing portion of this embodiment includes a pair of amplifiers 60 and 70 having different values of amplification factor and connected to the output of the unidimensional CCD sensor 18 in parallel with each other. An A/D (Analog-to-Digital) converter 61 and a line buffer 62 is connected in series to one 60 of the amplifiers, while an A/D converter 71 and a line buffer 72 are connected in series to the other amplifier 70. The signal processing portion further has a data evaluation/selection circuit 80 adapted for receiving the outputs from the line buffers 62, 72 and for selecting the output from one of the line buffers as the optimum data. The signal processing circuit further has arithmetic units 21, 22 similar to those in the preceding embodiments and adapted for computing the road surface irregularity information by processing the output from the data evaluation/selection circuit 80.

Assuming here that one 60 of the amplifiers has a smaller amplification factor than the other 70, the amplifiers 60 and 70 produce outputs as shown in FIGS. 15(1),(2) and 16(1),(2). The data evaluation/selection circuit 80 evaluate these outputs on the basis of a predetermined criterion. When the quantity of light reflected by the road surface is comparatively large, the amplifiers 60 and 70 deliver outputs as shown in FIG. 15(1) and FIG. 15(2), respectively. In such a case, the data evaluation/selection circuit 80 selects and output the data shown in FIG. 15(1) rather than that shown in FIG. 15(2). When the quantity of light reflected by the road surface is comparatively small, the amplifiers 60 and 70 deliver outputs as shown in FIG. 16(1) and FIG. 16(2), respectively. In such a case, the data evaluation/selection circuit 80 selects and output the data shown in FIG. 16(2) rather than that shown in FIG. 16(1). In this embodiment, the data selected and output from the data evaluation/selection circuit 80 is processed in the same manner as that performed by the first and second arithmetic units or equivalent means in the preceding embodiments. This embodiment, however, necessitates a specific process for enabling the data evaluation/selection circuit 80 to process the output from the photo-sensor portion 1B.

Figure 17:
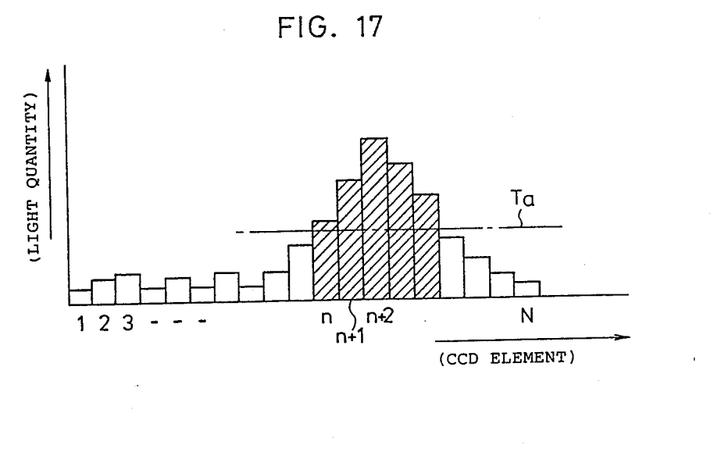
FIG. 17 is an illustration of a portion of operation of a data evaluation selection circuit incorporated in the processing system shown in FIG. 14.

The data from the line buffer 62 is represented by $V_a[i]$ (i=1 to N). Similarly, the data from the line buffer 62 is represented by $V_b[i]$ (i=1 to N). The symbol N represents the number of bits in the unidimensional CCD sensor. A threshold value $T_a$ is defined for the data $V_a[i]$ so that a group of serial data which meet the condition of $V_a \geq T_a$ is obtained. Then, a noise elimination and synthesizing operation is conducted on the group of data so as to determine blocks. This operation is shown in FIG. 17 and is represented by Step S 201 in the flow chart shown in FIG. 18.

Figure 18:
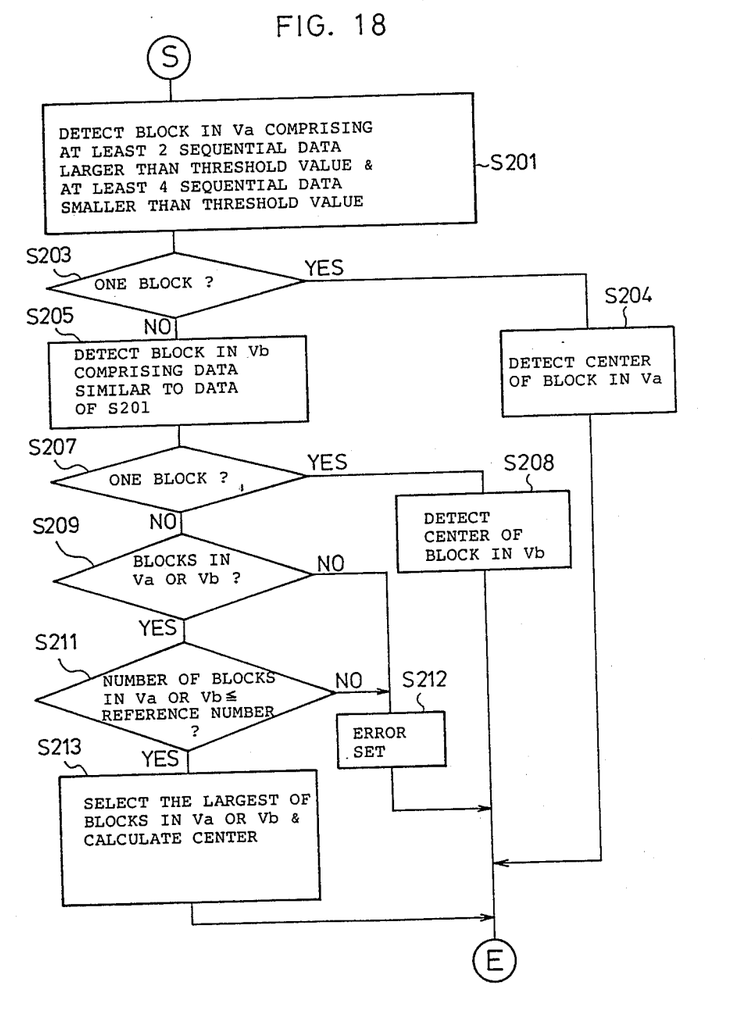
FIG. 18 is a flow chart of an example of a process for determining the position of the center of the beam spot.

When only one block has been detected through an inquiry posed in Step S 203, the position of the center of this block is computed immediately (S 204), and the computation in accordance with the formula (1) mentioned before is conducted so as to determine the height h. When two or more blocks are detected in Step S 203, a threshold value $T_b$ is determined for the data $V_b[i]$.

and noise elimination and synthesizing operation is conducted on a group of serial data which meets the condition of $V_b \geq T_b$ and the blocks thus determined are detected (S 205).

When only one block is detected in step S 205, a computation is conducted without delay so as to determine the position of the center of the block and then a computation in accordance with the formula (1) is executed to determine the height h.

In the event that no definite answer is obtained in Step S 201 or S 205, suitable block is determined in consideration of the number of blocks and the pattern of distribution of blocks (S 209 to S 213).

It is therefore possible to specify the position of the center of the received beam spot with a comparatively high degree of precision.

Figure 19:
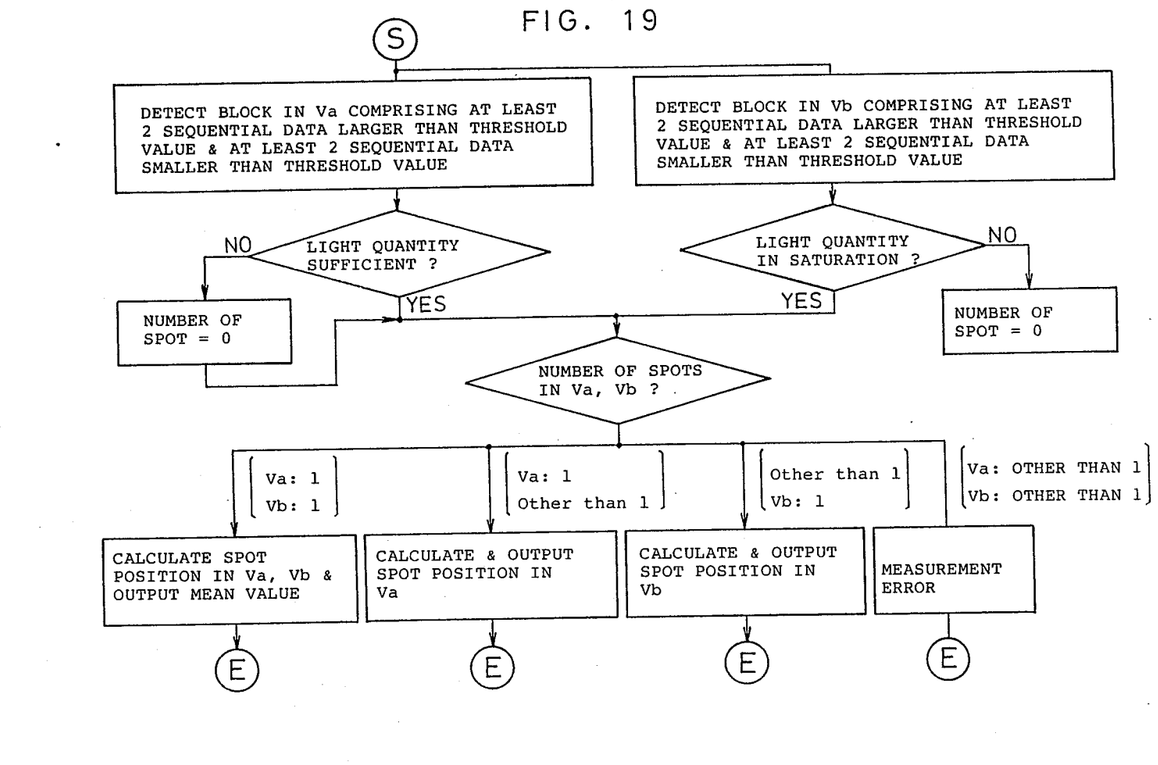
FIG. 19 is a flow chart of another example of the process for determining the position of the center of the beam spot.

FIG. 19 shows another system for specifying the position of center of the light-received spot.

In the system shown in FIG. 19, judgment is conducted whether the light quantities are sufficiently large without incurring saturation, for both the data $V_a$ and $V_b$. If both the data $V_a$ and $V_b$ are reliable, the mean value of both data is output, whereas, if either one of the two data has a higher degree of reliability than the other, the data of the higher reliability is output.

Thus, the system shown in FIG. 19 also ensures a high accuracy in the detection of position of the center of the received beam spot.

Both the systems shown in FIGS. 18 and 19 can enable the position of the center of the beam spot with a high degree of accuracy and, therefore, make it possible to compute and record the offset of the beam spot from the center of the unidimensional CCD sensor and, hence, the data concerning the irregularity of the road surface.

The embodiment shown in FIG. 14 employs a pair of A/D converters. This, however, is not exclusive and the same effect can be achieved by a single A/D converter provided that an analog memory and an analog multiplexer are connected to the output side of each of the amplifiers 60 and 70.

The use of the unidimensional CCD sensor as the photosensor also is illustrative, and other types of photosensors such as a CMOS sensor can be used equally well.

As will be understood from the foregoing description, according to the present invention, it is possible to accurately determine the position of the center of the beam spot and to precisely measure any irregularity on the road surface. In addition, the measurement can be conducted continuously along the surface of a road having a considerable length.

What is claimed is:

1. An apparatus for measuring irregularities on a road surface by applying a beam spot to a measuring point on said road surface and detecting any change in the vertical position of the beam spot thereby determining the height of said measuring point from a reference height, said apparatus comprising:
   a beam signal transmitting portion adapted for applying a light beam to said measuring point on said road surface;
   a photo-sensor portion for detecting the spot formed on said road surface by said light beam;
   an arithmetic circuit for conducting a predetermined arithmetic operation on the output from said photo-sensor portion so as to produce and output data concerning an irregularity on said road surface;
   at least two amplifiers connected to the output of said photo-sensor portion in parallel with each other and having different amplification factors; and
   data evaluation/selection circuit for selecting the output from one of said amplifiers as the optimum data and to deliver the selected data to said arithmetic circuit.

2. An apparatus according to claim 1, wherein said arithmetic circuit includes a first arithmetic unit for determining the position of center of the beam spot, and a second arithmetic unit for conducting a predetermined arithmetic operation on the output of said first arithmetic unit so as to produce and output data concerning an irregularity on said road surface.

3. An apparatus according to claim 1, wherein two said amplifiers are provided, further comprising first and second line buffers for storing outputs from the respective amplifiers, the outputs from said first and second line buffers being processed by different threshold values so that the position of the center of the beam spot i determined from signals in the respective data exceeding said threshold levels.

4. An apparatus according to claim 3 wherein the position of the center of said beam spot is determined on the basis of the mean value of the data output from said first and second line buffers.

5. An apparatus as recited in claim 1, wherein said photo=sensor portion includes a photo-sensor composed of a CMOS sensor.

6. An apparatus for measuring irregularities on a road surface, said apparatus comprising:
   (a) means for directing a reflectable light beam towards said road surface;
   (b) means for receiving a reflection of said reflectable light beam; and
   (c) means for determining the center point of said reflection of said light beam, said center point determining means comprising:
      (i) means for producing a received light level distribution;
      (ii) means for determining a maximum point of said received light level distribution; and
      (iii) means for determining an average level of said received light level distribution based on data produced by said maximum point determining means.

7. The apparatus as recited in claim 6, wherein said means for determining the center point further comprises
   (iv) means for producing an amplified received light level distribution.

8. The apparatus as recited in claim 7, wherein said means for determining further comprises:
   (v) means for determining a maximum point of said amplified reflected light level distribution.

9. The apparatus as recited in claim 6, wherein said means for producing a received light level distribution comprises a CCD sensor.

10. The apparatus as recited in claim 9, wherein said CCD sensor is a unidimensional CCD sensor.

11. A method of measuring irregularities of a road surface comprising the steps of:
   (a) directing a light beam toward the road surface;
   (b) detecting the reflection of the light beam on a plurality of bits having corresponding received light levels; and
   (c) determining the center of the reflected light beam on the plurality of bits by detecting the maximum of the received light levels and then using that information to determine the average of the received light levels.

* * * * *